W. H. HARING.
BRAKE SHOE.
APPLICATION FILED MAR. 24, 1908.
907,791.
Patented Dec. 29, 1908.
2 SHEETS—SHEET 1.
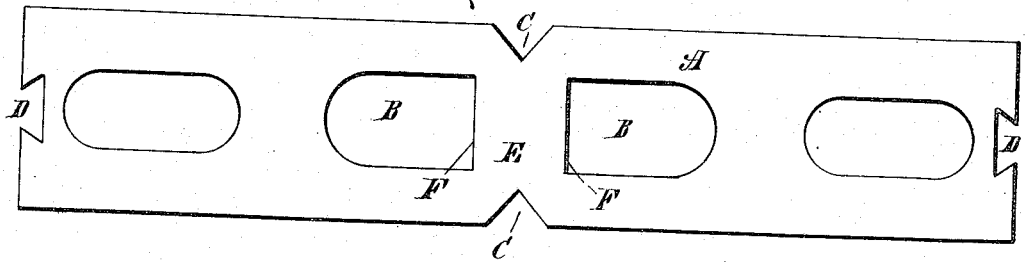
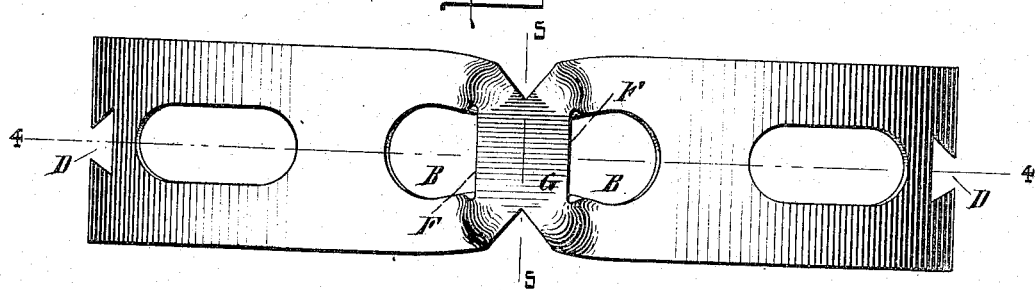
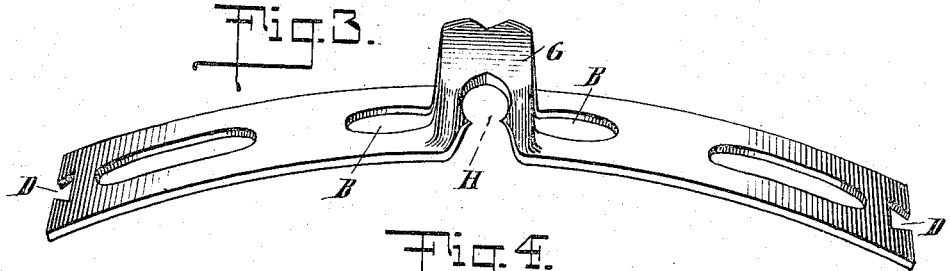
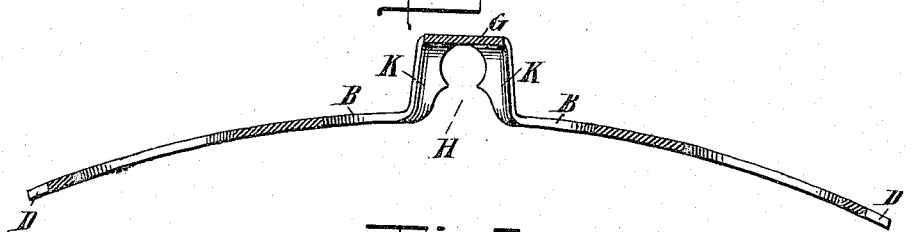
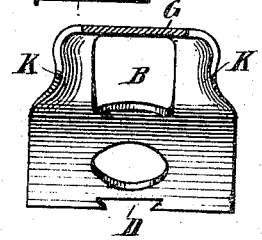
WITNESSES
INVENTOR
William H. Haring
BY George Cash
ATTORNEY W. H. HARING.
BRAKE SHOE.
APPLICATION FILED MAR. 24, 1908.
907,791.
Patented Dec. 29, 1908.
2 SHEETS—SHEET 2.
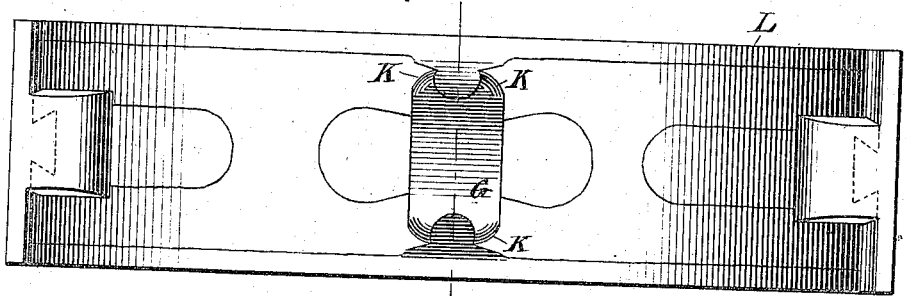
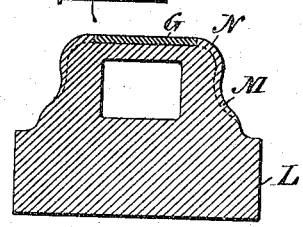
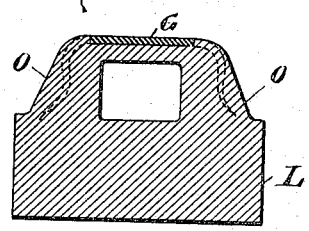
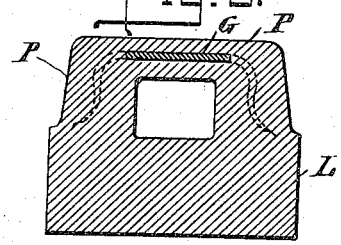
WITNESSES
INVENTOR
BY
ATTORNEY

UNITED STATES PATENT OFFICE.

WILLIAM H. HARING, OF SUFFERN, NEW YORK, ASSIGNOR TO EDWARD H. FALLOWS, OF NEW YORK, N. Y.

BRAKE-SHOE.

No. 907,791.     Specification of Letters Patent.     Patented Dec. 29, 1908.

Application filed March 24, 1908. Serial No. 422,934.

*To all whom it may concern:*

Be it known that I, WILLIAM H. HARING, a citizen of the United States, and a resident of Suffern, in the county of Rockland and State of New York, have made and invented certain new and useful Improvements in Brake-Shoes, of which the following is a specification.

My invention relates to brake shoes, and more particularly to that part or portion thereof commonly known and referred to as the steel back, the object being to provide a back made from a single strip of metal, and with an integral key-lug.

A further object is to provide a back for a brake shoe which can be quickly and economically made, which may be securely anchored or locked to the body portion throughout the entire length thereof, and which shall be possessed of sufficient strength to withstand any and all strains which may be imposed upon it.

With these and other ends in view, my invention consists in certain novel features of construction, as will be hereinafter fully described and pointed out in the claims.

In the accompanying drawings Figure 1 is a plan view of the blank from which the back is formed. Fig. 2 is a plan view of the finished back. Fig. 3 is a perspective view of the back. Fig. 4 is a sectional view taken on the line 4—4 of Fig. 2. Fig. 5 is a sectional view taken on the line 5—5 of Fig. 2. Fig. 6 is a plan view of a brake shoe showing the back secured to the cast metal body portion. Fig. 7 is a sectional view taken on the line 7—7 of Fig. 6. Figs. 8 and 9 are views similar to Fig. 7, showing slight modifications.

Referring to the drawings, A indicates a blank of steel, wrought iron, or other suitable ductile metal, said blank being preferably cut from a plate or strip of metal of suitable thickness and of a width equal to the length of the desired blank, the latter being of somewhat greater length than that of the finished back. The plate or strip is fed to a suitable machine (not shown), by means of which the blanks are cut therefrom, and at the same time, and by the same operation, the metal is punched or perforated to form openings or recesses B, which are formed at the opposite sides of the transverse median line of the blank, and which are provided with straight inner sides or edges parallel with one another as shown at F in Fig. 1, said openings or recesses being spaced apart a distance such that the strip of metal E lying therebetween, will have a width equal to the width of the top of the finished key-lug. Oppositely disposed notches or recesses C are also formed in the blank at the same time that the openings B are formed, said notches extending inwardly a suitable distance from the central portions of the sides of the blank, as clearly shown in Fig. 1. If desired, I may further provide the blank with perforations or openings as is usual in backs of this description, and also with dovetailed notches or recesses D at the ends thereof, through which perforations and notches the molten metal is allowed to run during the casting of the body portion upon the back, in order that the parts may be firmly locked together in the well known manner. The blank is then subjected to the action of suitable dies, whereby the metal strip E at the center of the blank, will be forced upwardly, thus forming the key-lug G, and at the same time, the ends of the blank will be drawn towards one another and given a curvature in the direction of their length corresponding to the curvature of the brake shoe, as shown in Fig. 3, which shows the back in its completed or finished condition.

The key-lug G has recesses or openings H in its end walls and top, as shown in Figs. 2 and 3, the portions of the openings H at the top of the lug being due to the notches or recesses C, which were formed in the sides of the blank, and during the casting of the body portion upon the back the molten metal will pass through these openings and be anchored to the metal portions K which extend from the upper surface of the key-lug to the main portion of the back, thereby providing an extremely firm anchorage between the body of the shoe and the back at its central portion.

In Figs. 6 and 7 I have shown my improved back having a cast metal body portion L secured thereto, the metal of the body portion being surrounded by the metal portions K of the lug G, as shown at M, (Fig. 7), and being anchored within the opening in the top of the lug as indicated at N.

In Fig. 8, the metal portions K of the lug are shown as being embedded within the metal of the body portion, as indicated at O, while in Fig. 9, the entire lug is shown embedded within the cast metal, as indicated at P. In each instance, however, it will be seen that the metal of the body portion is anchored to the lug at the openings in the sides and top thereof, thereby forming a firm anchorage at the central portion of the shoe.

It will of course be understood that backs of different widths may be constructed and that key-lugs of various widths and transverse dimensions may be formed depending upon the spacing apart of the recesses or openings B, and the depth of the inwardly extending notches C.

It will be seen from the above description that I have provided a metal back which is strong and durable, which may be rapidly and cheaply constructed, which in its manufacture comprises but two operations, which may be securely locked to the body portion or wearing sole of the shoe and its central portion, and in the manufacture of which the loss of metal is reduced to a minimum.

Having fully described my invention, what I claim as new and desire to secure by Letters Patent, is:—

1. A back for a brake shoe formed from a single strip of metal and provided with an integral key-lug, the end walls of the latter being notched, substantially as described.

2. A back for a brake shoe formed from a single strip of metal and provided with an integral key-lug, said key-lug being provided with openings located partly in the end walls and partly in the top thereof, substantially as described.

3. A brake shoe back comprising a plate of substantially uniform width and an integral key-lug provided with openings in its end walls, the transverse dimension of said key-lug being less than the width of said plate, substantially as described.

4. A brake shoe comprising a metal body portion and a ductile key-lug provided with an opening in its top with which the metal of the body portion engages, thereby forming a firm anchorage between said parts, substantially as described.

5. A brake shoe comprising a metal body portion, and a ductile metal plate secured adjacent the back thereof, a ductile metal key-lug secured to said plate and provided with an opening in its top with which the metal of the body portion engages to form an anchorage, substantially as described.

6. A brake shoe comprising a metal body portion, and a ductile metal plate provided with an integral key-lug secured adjacent the back thereof, said key-lug being provided with an opening in its top with which the metal of the body portion engages to form an anchorage, substantially as described.

7. A brake shoe comprising a metal body portion, and a ductile metal plate provided with an integral key-lug secured adjacent the back thereof, said key-lug being provided with openings located partly in its end walls and partly in its top, with which the metal of the body portion engages to form an anchorage, substantially as described.

Signed at Mahwah, in the county of Bergen and State of New Jersey, this 21st day of March, A. D. 1908.

WILLIAM H. HARING.

Witnesses:
R. C. CLARK,
F. J. SEYMOUR.